US009632875B2

(12) United States Patent
Raichstein et al.

(10) Patent No.: US 9,632,875 B2
(45) Date of Patent: Apr. 25, 2017

(54) AUTOMATED AND SELF-ADJUSTING DATA PROTECTION DRIVEN BY BUSINESS AND DATA ACTIVITY EVENTS

(75) Inventors: Eran Raichstein, Yokneam Illit (IL); James P. Smith, Redwood City, CA (US); Gregory J. Tevis, Tucson, AZ (US); David G. Van Hise, Tucson, AZ (US); Oren Wolf, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 12/899,167

(22) Filed: Oct. 6, 2010

(65) Prior Publication Data
US 2012/0089572 A1 Apr. 12, 2012

(51) Int. Cl.
*G06F 17/30* (2006.01)
*G06F 11/14* (2006.01)

(52) U.S. Cl.
CPC ...... *G06F 11/1461* (2013.01); *G06F 17/3015* (2013.01)

(58) Field of Classification Search
CPC .................. G06F 17/3015; G06F 17/30088
USPC ......................................................... 707/645
See application file for complete search history.

(56) References Cited

U.S. PATENT DOCUMENTS

| 7,225,208 | B2 | 5/2007 | Midgley et al. |
| 7,330,997 | B1* | 2/2008 | Odom ........................... 714/6.23 |
| 7,509,468 | B1* | 3/2009 | Dalal .................. G06F 11/1458 711/152 |
| 8,260,750 | B1* | 9/2012 | Gugick ............... G06F 11/1451 707/645 |
| 2007/0136541 | A1 | 6/2007 | Herz et al. |
| 2008/0005204 | A1* | 1/2008 | Prus ..................... G11B 27/002 |
| 2008/0034019 | A1 | 2/2008 | Cisler et al. |
| 2008/0046483 | A1 | 2/2008 | Lehr et al. |

(Continued)

FOREIGN PATENT DOCUMENTS

| CN | 101241456 | 8/2008 |
| EP | 0769741 A1 | 4/1997 |
| JP | 2005309828 | 11/2005 |

OTHER PUBLICATIONS

Communication Relating to the Results of the Partial International Search, PCT/EP2011/066294, Dec. 19, 2011.
Chinese Office Action, Feb. 28, 2015.

*Primary Examiner* — Mahesh Dwivedi
*Assistant Examiner* — Johnese Johnson
(74) *Attorney, Agent, or Firm* — Kunzier Law Group (57) ABSTRACT

Techniques for adjusting the frequency of data backups and initiating event-driven backups in a storage system are disclosed herein. In one embodiment, a self-adjusting backup frequency, known as a "Change Rate Objective," is defined to conduct or delay backups for one or more volumes in the storage system on the basis of an associated policy value. The Change Rate Objective may be tied to one or more business or data activity events, such as the amount and type of data changes since a last backup. The storage system may also be tailored to conduct or delay full or incremental backups on the basis of a Change Rate Objective that measures whether a full or incremental or differential backup is more appropriate. Various data or system failures, or data or business events may also be used to adjust the retention periods of continuous data protection (CDP) data and delay a rollup of CDP data.

16 Claims, 3 Drawing Sheets

(56) References Cited

U.S. PATENT DOCUMENTS

2008/0086609 A1    4/2008  Lesser et al.
2008/0301175 A1*  12/2008  Applebaum et al. ......... 707/102
2009/0222499 A1    9/2009  Tan et al.
2009/0313503 A1*  12/2009  Atluri ................. G06F 11/1453
                                                       714/19

* cited by examiner

AUTOMATED AND SELF-ADJUSTING DATA PROTECTION DRIVEN BY BUSINESS AND DATA ACTIVITY EVENTS

FIELD OF THE INVENTION

The present invention generally relates to data storage and recovery techniques. The present invention more specifically relates to data backup activities and procedures initiated by business and data activity events that enable valuable data to be stored and recovered.

BACKGROUND OF THE INVENTION

Tremendous data growth and evolving requirements for data availability continue to demand innovation in the critical operations of data protection and recovery. Legacy daily backups are insufficient for many business environments today. There is a need for more efficient and more frequent backups which has led to the proliferation of efficient, block level, incremental forever data backup techniques. Current backup techniques have even resulted in Continuous Data Protection (CDP) strategies that may capture and protect every data change occurring at the Input/Output (I/O) level.

Despite these advancements in data protection operations, there are still inefficiencies in current methods. For example, most data protection operations are time-based (daily, hourly, etc). While there is some flexibility and granularity in how often data protection operations are run, time-based data protection operations are, by nature, inconsistent with business data activities. Business data activities are often event-based, not time-based.

CDP solutions protect data at the individual I/O event level, not on a time basis. CDP protects data at a very low granularity of data activity (i.e., individual I/O operations) and thus has significant potential value for recovery. However, there are some drawbacks of CDP operations. One drawback of CDP is that individual I/O operations often do not directly represent any business event. Therefore, recovery at the individual I/O level may not directly represent business value. Yet another drawback of CDP operations is that it is extremely difficult and even sometimes impossible to synchronize individual I/O operations with application transactions. Again, recovery at the individual I/O level may not represent a complete application or business transaction and is thus limited in value. In addition, the potential value of data protection at the low level of granularity provided by CDP is not fully exploited. The granularity of CDP data is typically lost when CDP data is rolled up into snapshots or other backups, and is thus unavailable for a variety of data failure events. CDP data may be saved for longer periods of time by configuring a longer retention period, but this is very expensive in terms of processing and storage. For these reasons, CDP backups, though valuable, are not pervasively used in the industry.

BRIEF SUMMARY OF THE INVENTION

The present disclosure describes the implementation of a series of improved data protection methods designed to make an Information Infrastructure more aware of and more responsive to its environment—particularly as a response to business and data activity events. Business data events include activities such as business transactions that modify or create data, upgrades to business applications, data movements or copies required by technology uplifts, distribution of new software, system configuration changes, storage volume defragmentation processes, and the like. These business data events are not fully captured and protected by existing data backup and recovery solutions that occur as a result of a time-based schedule or I/O operations.

Further, the data protection techniques described herein are also able to respond to data activity events within an Information Infrastructure, such as conducting a full backup based on the amount of data changed since the last full backup. The numerous variations to the presently disclosed techniques provide a robust and customizable backup solution that can meet recovery time and recovery point objectives (RTO and RPO) much faster and more efficiently than time-based backup rules.

In one specific embodiment of the present invention disclosed herein, a method for performing event-driven automated and self-adjusting backup operations in a storage management system includes establishing a change rate objective and an associated change rate objective value used for event-driven backups of a data store. This change rate objective is used to measure changes within the data store resulting from one or more data activity events, such as the amount or type of data changed within the data store. The change rate objective may also be a derived value based on multiple values.

The change rate objective within the data store and any appropriate data activities are then monitored to determine whether adequate changes have occurred and backup operations are warranted. The backup operations are then performed responsive to meeting or exceeding the change rate objective value. The backup operations may be further customized or modified on the basis of a policy. Additionally, the backup operations may be coordinated with time-based scheduled backup operations.

In another specific embodiment of the present invention, automated and self-adjusting backup operations may be performed in connection with full and incremental or differential backups of a data store. Multiple change rate objectives are employed to determine whether to postpone or accelerate timing for a full backup (and likewise to postpone or accelerate an incremental or differential backup). For example, a first change rate objective and an associated first change rate objective value may be established for conducting a full backup of the data store prior to a scheduled full backup, with the first change rate objective value defining a threshold amount of changed data of the data store requiring the full backup. A second change rate objective and an associated second change rate objective value may be established for postponing a scheduled full backup and conducting an incremental or differential backup in lieu of the scheduled full backup, with the second change rate objective value defining a maximum amount of changed data of the data store allowing an incremental or differential backup. The amount of data that has changed since a last full backup is monitored, and a full backup of the data store is conducted responsive to determining (a) the amount of changed data backed up since the last full backup is greater than the first change rate objective value during an incremental or differential backup cycle, or (b) the amount of changed data backed up since the last full backup is greater than the second change rate objective value during a full backup cycle; and likewise an incremental or differential backup of the data store is conducted responsive to determining (a) the amount of changed data backed up for the data store since the last full backup is less or equal than the first change rate objective value during an incremental or differential backup cycle, or (b) the amount of changed data backed up since the last full backup is less or equal than the second change rate objective value during a full backup cycle.

Another specific embodiment of the present invention provides for automated and self-adjusting data protection in connection with continuous data protection operations of a data store. This is established through a policy to extend the retention of data produced from the continuous data protection operations over a period of time, as the policy indicates one or more events requiring a retention period extension and duration of the retention period extension. When a data rollup is initiated for retained data, the retention period extension will be retrieved from the policy according to the appropriate events. Ultimately the data rollup will be postponed for the duration of the retention period.

Another specific embodiment of the present invention provides for a storage management system comprising a processor, a memory unit, and instructions stored within the memory unit for performing event-driven automated and self-adjusting data protection activities consistent with the techniques described herein. Additionally, another specific embodiment of the present invention provides for a computer program product for performing event-driven automated and self-adjusting data protection activities, with the computer program product comprising a computer readable storage medium having computer readable program code embodied therewith to implement the techniques described herein.

DETAILED DESCRIPTION OF THE INVENTION

The present disclosure provides a set of data backup techniques that may be used separately or in conjunction with existing data backup scenarios. In contrast to existing data backup strategies that are time-based only (e.g., performing backups nightly at 12 AM), a data backup schedule may be modified by the various techniques of the present invention to occur more or less frequently on the basis of other relevant factors. These factors may be triggered by business or data activity events that more accurately drive the underlying need to perform the data backup in the first place.

The present disclosure describes improved data protection methods that may be time-based, adjustable based on changing environment conditions, and may also be event-based and tied directly to business events and data activity. These methods address the need for more efficient backup methods that are fully synchronized with applications and only run when required by business or data activity events. Further, these methods also address the need for improvements in CDP operations such that retention times for CDP data can be automatically adjusted based on data or system failures, or on business events.

One embodiment disclosed herein provides a data protection method that automatically adjusts the frequency of data backup operations based on data activity events. As data change activities increase, the frequency of data backup operations may increase. Likewise, when data change activities slow down or stop, backup operations might be performed less frequently, thus preserving system resources. This self-adjusting backup frequency method can also perform regularly scheduled backups in coordination with the event-driven backups. This self adjusting backup frequency (referred to herein as a "Change Rate Objective" or "CRO") may be based on a specific amount of data (e.g., 5 GB of changed blocks since the last snapshot) or it may be based on a percentage of data changed (e.g., if 1% of data has changed since the last backup) or a number of data transactions. Further, the CRO may be configured to apply to the creation of certain backup or disaster recovery copies, or otherwise trigger useful events.

A further embodiment provides the data protection method as described above, enhanced with a data activity backup policy that specifies the sensitivity of backup operations to data change activities in a storage management system. This policy is in addition to, and coordinated with, the specifications of the frequency of backup operations that are commonly used in existing time-based scenarios.

Another embodiment provides an enhanced analysis of a changed rate objective applied to a traditional full backup plus incremental/differential backup approach. The amount of data backed up in incremental or differential backups since the last full backup is tracked. When it comes time to do the next full (or image) backup (e.g., a weekly full backup), if the amount of incremental data backed up since the last full backup is less than some specified amount (a change rate objective value), the full backup is postponed until the amount of incremental backup data reaches the specified amount. Conversely, if during an incremental backup it is determined that some specified amount of data (or percentage of the full backup) has changed since the last full backup, an unscheduled full backup is initiated. This approach minimizes data protection operations when they are not needed, to prevent performing unnecessary full backups when very little data has changed. This approach also initiates event-driven data protection operations when required to facilitate recovery (e.g., starting a full backup early if there is a lot of changed data). In many scenarios, performing a full backup when there is a large amount of data change can enable faster recovery times by avoiding having to apply large amounts of incremental recoveries on top of the full backup.

Another embodiment of the present invention provides improved Continuous Data Protection (CDP) techniques that automatically adjust retention periods for CDP data, based on data or system failures, or on business events. CDP data is typically rolled up into snapshots or backups on a regular (often timed) basis. When this is done, the low, I/O level of data protection granularity is lost. When a data, system, or storage failure event occurs, there is a much higher probability that recent CDP data might be required. Rather than allowing CDP data to roll off and lose low levels of granular recovery, in this embodiment CDP data retention periods are automatically adjusted (i.e., extended) based on a change rate objective value to retain this data longer when possible recovery events are recognized.

Figure 1:
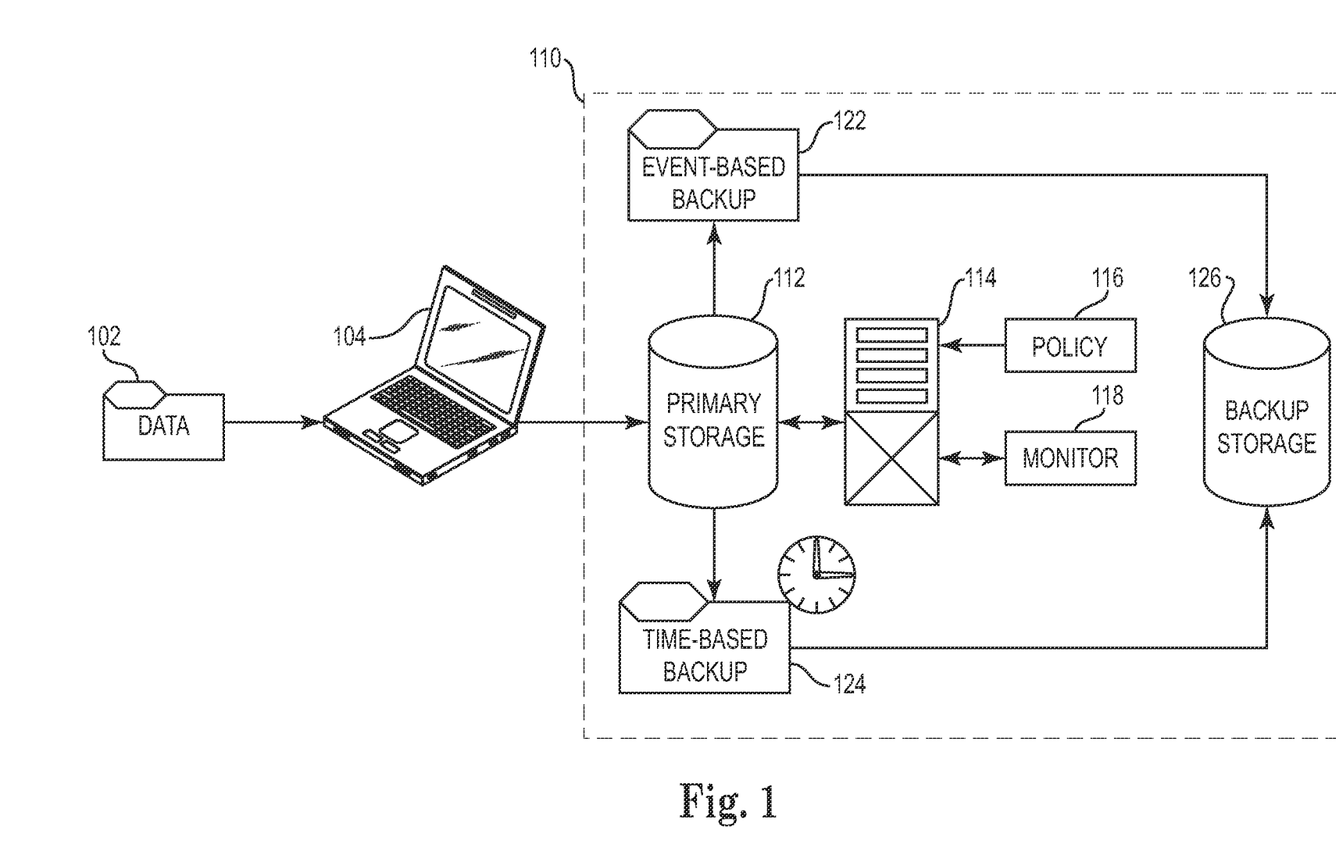
FIG. 1 provides an illustration of a data backup procedure conducted within a storage management system according to an embodiment of the present invention.

Referring to FIG. 1, data storage and backup operations are depicted within a storage management system 110 operable in connection with an embodiment of the present invention. The storage management system 110 functions to store and manage data such as data file 102 provided by client computing device 104. Within the storage management system, the primary data store 112 is typically used to maintain a working copy of data. A backup data store 126 is also typically used to maintain a redundant copy of data changes from the primary data store 112.

In the configuration of FIG. 1, the storage management system 110 provides a processing server 114 responsible for managing the data storage and backup operations within the system 110. The processing server 114 is configured to implement data backup and storage policies 116, as data storage activities within the primary data store 112 are monitored with a monitor 118. The monitor 118 acts to watch for triggering events or schedules in connection with data backup activities and the policies 116. Upon a determination of the need to conduct a backup, the processing server will then proceed with necessary backup activities, such as an event-based backup 122 or a time-based backup 124 to the backup data store 126.

Policies that specify the sensitivity of backup operations to data change activities can be implemented in any of several ways without departing from the scope of the present invention. For example, the policy may include a parameter for turning on and off a Changed Rate Objective or event-based backup. When turned off, backup operations may follow normal time-based backups. When turned on, large amounts of changed data or large numbers of I/O transactions may result in backup operations being performed outside the normal time-based backups.

The policy may also include a Change Rate Objective based on a variety of sources, including the rates of activity, the amount of data, the number I/O operations performed, amount of changed metadata, or defined percentages. For example, the Change Rate Objective may be a percentage of the total expected amount of data to be backed up in the next time-scheduled backup. The expected amount of data to be backed up can be determined using any number of methods—such as using the total size of data backed up for a given client, using the size of the last full backup, or using the average size of backups over a period of time.

As another example, the Change Rate Objective may be a percentage of the total amount of data backed up for a given client. Or, the Change Rate Objective may be a specified amount of changed data (e.g., the number of Gigabytes of changed data). Thus in one embodiment, a different type of Change Rate Objective and threshold may be used for each criteria. For example, the following Change Rate Objectives values and thresholds may be deployed in a policy as follows:

CRO_#GB_Changed_Data, defined as an integer value. This value represents the current amount of changed data, in Gigabytes, for the current backup operation.

CRO_#GB_Changed_Data_Threshold, defined as an integer value. This is the threshold value upon which a decision may be made for whether to continue, initiate, or alter a current backup operation.

CRO_#MB_Changed_Metadata, defined as an integer value. This value represents the current amount of changed metadata (for example, file system access control changes), in Megabytes, for the current backup operation.

CRO_#MB_Changed_Metadata_Threshold, defined as an integer value. This is the threshold value upon which a decision may be made for whether to continue, initiate, or alter a current backup operation.

CRO_%_of_Total_Client_Backup_Data, defined as an integer (percentage) value. This value represents the amount of changed data for the current backup operation as a percentage of the total amount of data backed up for the client.

CRO_%_of_Total_Client_Backup_Data_Threshold, defined as an integer (percentage) value. This is the threshold value upon which a decision may be made for whether to continue, initiate, or alter a current backup operation.

In this embodiment, each Change Rate Objective may be evaluated against its corresponding Change Rate Objective threshold to determine if the current backup operation should continue or be altered in any way.

Further, the Change Rate Objective may be a normalized value that is derived from a combination of these factors. In another embodiment, a single normalized value is used that incorporates one or more of the criteria. For example, the Change Rate Objective values and thresholds described above may be combined into a single normalized value that provides further analysis as input to the disclosed self-adjusting backup operations.

In one embodiment, CRO_#GB_Changed_Data is divided by CRO_#GB_Changed_Data_Threshold, CRO_#MB_Changed_Metadata is divided by CRO_#MB_Changed_Metadata_Threshold, and CRO_%_of_Total_Client_Backup_Data is divided by CRO_%_of_Total_Client_Backup_Data_Threshold to provide three Change Rate Objectives percentages. The average of these three Change Rate Objectives percentages is taken to give a CRO_Normalized_Value. The CRO_Normalized_Value is then compared against a client configured CRO_Normalized_Value_Threshold to determine if the current backup operation should continue or be altered in any way. This provides additional analysis for self-adjusting backup operations.

Consider a backup scenario where each of the individual Change Rate Objective values are just under their respective Change Rate Objectives thresholds (say, each is 95% of its threshold). No automated adjustments to the backup operations would be triggered by these individual CROs. However, if CRO_Normalized_Value_Threshold was set at 90%, this scenario would still have sufficient change activity to warrant some adjustment of backup operations.

The Change Rate Objective may also be specified as the number of application or I/O transactions since the last backup (e.g., one embodiment may track the number of I/O operations with a device driver implementation and compare this to the Change Rate Objective; whereas another embodiment may monitor application transaction counters such as the System Change Number in an Oracle Database and compare this to the Change Rate Objective). When the Change Rate Objective is reached, an additional backup operation may be initiated. A further policy parameter may specify whether to perform this changed data event-driven backup in addition to, or in lieu of, the next regular time-based backup.

It is apparent that by adjusting these policy parameters, the sensitivity of backup operations may be adjusted to data change rate activity. For example, assume the Change Rate Objective is implemented as a percentage of the total amount of data backed up for a client and that 2-5% of that client's data typically changes between each scheduled backup. If the Change Rate Objective is set to 100%, an extra changed data driven backup will probably rarely, if ever, be performed. But if the Change Rate Objective is set to 5% or lower, then extra changed data-driven backups will occur in almost every backup cycle. In some data store implementations, the Change Rate Objective will function most effectively when set between the range of 5-10%.

Two important concepts relevant to the data protection and recovery solutions disclosed herein are commonly known as Recovery Time Objectives (RTO) and Recovery Point Objectives (RPO). Recovery Time Objectives specify how quickly a business needs to recover lost data. Recovery Point Objectives specify how far back in time a business can afford to lose data. RTO and RPO are both typically implemented as time-based objectives. For instance, a customer might require a RTO of 1 hour to recovery and can only tolerate 3 hours worth of data loss (RPO). However, like data protection operations, time-based RPOs can also be inconsistent with business data activities. For example, consider what happens if a RPO is 3 hours. In some cases this may be sufficient. However, in times when there is intensive work being done on the system (resulting in large amounts of data changes that need to be backed up), a 3 hour RPO may be insufficient and expose a business to a severe data loss. A Change Rate Objective provides improvements over the use of RTO and RPO, to allow recognition and response to increased data change activity or increased transaction activity with an increased frequency of data backup operations.

As previously discussed, existing data protection techniques in the art are generally time-scheduled and not directly associated with data activity or business events. CDP data protection is generally I/O event-based (not time-based), but it presents drawbacks when used as the exclusive data backup strategy. The disclosed embodiments of the present invention provide improved data protection techniques that, in addition to factoring time-based schedules, also may be tied directly to important business events and data activity.

Therefore, the data protection methods disclosed herein may enable, in addition to time-based backup operations, backup operations driven by data activity and business events. Monitors may be used to exploit techniques that recognize these events, ultimately leading to responses to these events. For example, a monitor may be configured to recognize specific business events, assess the impact of those events on data protection operations, analyze policy related to the specific events, and initiate event-driven backups as warranted. These types of policy-based backup operations enable event-based recoveries (such as the recovery of data at a point in time before a specific business event occurred).

As a non-limiting list of relevant business events, backup activities may be initiated based on: upgrades to business applications; data movements or copies required by technology uplifts, application migrations, server migrations, and the like; distribution of new software; system configuration changes; storage volume defragmentation processes; I/O errors on volumes; events which change large sets of data; events which change large amounts of metadata such as changes to data security settings; and other similar events or event triggers.

The following sections provide additional detail and working examples of embodiments configured to implement data backups with the use of a change rate objective (a) in connection with event-driven backup operations; (b) in full versus incremental/differential backup scenarios; and (c) in connection with improved CDP backup operations. Those skilled in the art would recognize that a number of variations to these techniques may be used and applied within a storage system, such as the combination of a changed rate objective event-driven backup with full or incremental backups.

Example of a Data Activity Backup Policy with Change Rate Objective Values

In one specific embodiment, a data activity backup policy may be defined within a software environment through the use of a set of variable data values. These values are provided in examples of the following paragraphs as policy values. As is evident, the data activity backup policy may be implemented in a software environment with alternate names or through the use of programming language values, values within an XML data file, direct input from a user within a user interface, or like types of settings and selections. In one embodiment these policy values may include:

Perform_Changed_Data_Backups, with values "ON" or "OFF". This value specifies whether to use changed data as a trigger to kick off extra backups.

Perform_Regular_Scheduled_Backups, with values "ON" or "OFF". This value specifies whether to perform regular scheduled backups (e.g., time-based backups) in conjunction with changed data backups.

Perform_Next_Scheduled_Backup, with values "YES" or "NO". This value specifies whether to continue with the next regularly scheduled backup after a changed data backup is performed.

Change_Rate_Objective, with an integer value. This value specifies the changed data as a percentage of total amount of backed up data for a client; or the number of GB of changed data; or the number of transactions before kicking off an extra event-driven backup. As described herein, a different type of Change Rate Objective and threshold may be used for each criteria. As further described herein, this value may also be normalized and derived from multiple values or a combination of sources.

This data activity backup policy may then be applied within a storage system to conduct data backups and scheduled backups as triggered by the change rate objective value. The change rate objective generally is a variable value that may be modified by a system administrator as appropriate. For example, a system administrator recognizing that resource-intensive backups are too frequently occurring may increase the change rate objective value. If the change rate objective value is based on a combination of factors, minimum or maximum values may be associated with the factors in whole or in part. (e.g., a configuration may automatically trigger a backup at a 5 GB or an 8% change in the data store, whichever occurs first).

Example of Data Backup Policy used with Full and Incremental Backup Methods

When a full plus incremental (or full plus differential) backup approach is employed in a storage system, special policy processing and analysis is used. In combination with existing techniques (e.g., with full plus differential backup methods), the amount of data that has changed since the last full backup may be tracked. This special policy processing and analysis may be accomplished by defining the following policy to monitor data activity occurring since a last full backup.

Perform_Changed_Data_Analysis_Since_Full_Backups, a value defined as either "ON" or "OFF", specifying whether to use changed data since the last full backup as a trigger to automatically control whether a full or incremental backup is performed.

Change_Rate_Objective_For_Incremental, a value defined as an integer representing the amount of changed data as a percent of total amount of backed up data since full backup for a client; or the amount of changed data (e.g., the number of gigabytes). If the amount of changed data is less than this value, perform an incremental or differential rather than a full backup.

Change_Rate_Objective_For_Full, a value defined as an integer representing the amount of changed data as a percentage of the total amount of backed up data since full backup for a client; or the amount of changed data (e.g., the number of gigabytes). If the amount of changed data is greater than this value, perform a full backup rather than an incremental or differential backup.

Full_Backups_OK, a value defined as an integer array of start and stop times in 24 hour clock time for when it is acceptable to perform full backups. Other time period representations and ranges may be used instead of an integer array.

Figure 2:
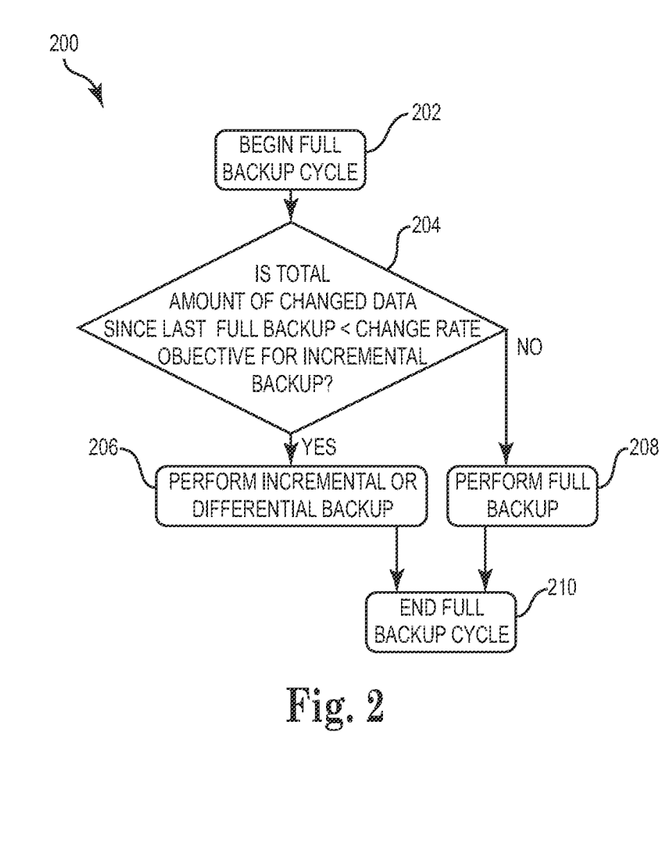
FIG. 2 provides an illustration of a flowchart for a data backup procedure occurring during a full backup cycle according to an embodiment of the present invention.

FIG. 2 provides an illustration of a logic flow 200 for an improved full backup cycle according to one embodiment of the present invention. When it is time to perform the next full backup (typically scheduled weekly) as in step 202, the total amount of changed data since the last full backup is determined as in step 204. If the total amount of changed data since the last full backup is less than the amount specified by the change rate objective—"incremental backup" policy value (Change_Rate_Objective_For_Incremental), then do not perform a full backup but rather perform another incremental or differential backup as in step 206. If the Change Rate Objective incremental backup policy value has been reached or exceeded as in step 204, then proceed with the full backup as in step 208. This completes special processing needed for the full backup cycle as in 210.

Figure 3:
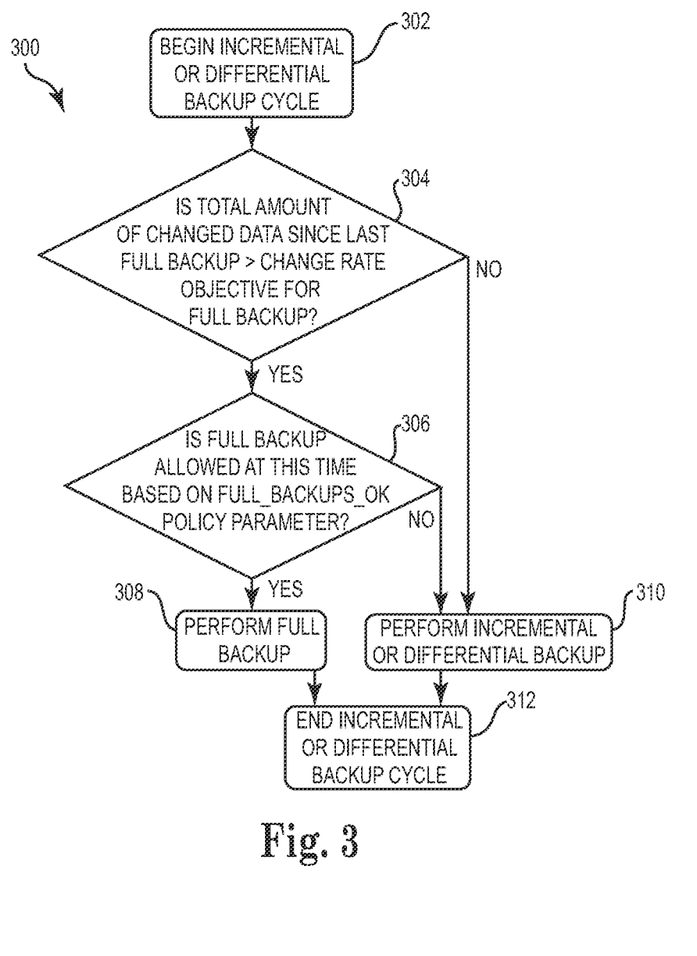
FIG. 3 provides an illustration of a flowchart for a data backup procedure occurring during an incremental or differential backup cycle according to an embodiment of the present invention.

FIG. 3 provides an illustration of a logic flow 300 for an improved incremental or differential backup cycle according to one embodiment of the present invention. When it is time to perform the next incremental or differential backup cycle (typically scheduled hourly or daily) as in step 302, the total amount of changed data since the last full backup is determined again as in step 304. If the total amount of changed data since the last full backup is less than the amount specified by the change rate objective—"full backup" policy value (Change_Rate_Objective_For_Full) as determined in step 304, then an incremental or differential backup is performed as in step 310. If the total amount of changed data since the last full backup is greater than the full backup policy value then an additional query is performed. This additional query determines if a full backup is allowed by the policy during this time period (Full_Backups_OK) as in step 306. If a full backup is allowed by the policy, it is performed as in step 308; if not, an incremental or differential backup is performed as in step 310. This completes the change rate objective processing for an incremental or differential backup cycle as in step 312.

CDP Adjustments Based on Events

In one embodiment, CDP techniques may be configured to automatically adjust retention periods based on data or system failures, or on business or data activity events. CDP operations may be improved through the use of an interface and policy to expect the notification of possible business recovery events. In addition, a new policy may be introduced to allow dynamic adjustments to CDP data retention periods.

A monitor of data or system failures, or on business events which impact CDP and backup storage operations may be used according to a variety of monitoring techniques and technology. This monitor may be configured to recognize various business failures or recovery events that might impact CDP operations. For example, business failures or events might include failure of a server, volume, or application, or some other outage in the computing environment within which the volume resides. Any such type of failure or event might indicate a need to retain recent CDP data for all possibly affected volumes for a longer period of time.

In one embodiment, when a monitor recognizes a failure or event, it may be configured to send an API call to an enhanced CDP component for each volume or entity for which CDP is being performed that might be impacted by the event. This indicates to the improved CDP component the need to extend the retention time period of CDP data for each of those volumes. When the event is cleared, another API call is sent to the improved CDP component for each volume. This indicates to the improved CDP component that the retention period extensions may be released, and the normal policy for CDP data retention for that volume may be resumed.

An adjustable retention period may be used to control the severity of the event as determined by the monitor(s). The higher the severity of the event, the longer time the CDP data is retained for. When an event is cleared, or when the dynamically assigned retention extension has passed, the improved CDP component resumes its normal policy for CDP data retention.

In the specific embodiment referenced above, API calls may be defined within the enhanced CDP component to receive information related to the notification of a CDP data retention event and the clearing of the event. The following demonstrates non-limiting examples of two APIs to establish and clear data retention events respectively:

CDP_Data_Retention_API (Server ID, Application ID, Volume ID, Time of Event, Severity of Event, Event Identifier, Completion Status); and Event_Clear_API (Server ID, Application ID, Volume ID, Event Identifier, Completion Status);

The parameters used in these example APIs may be configured to accept or return the following data values: Server ID—indicating the name of the server owning the volume with CDP data; Application ID—if applicable, indicating the name of the application owning the volume with CDP data; Volume ID—indicating the unique identifier of the volume for which CDP is being performed and which might be impacted by a business failure or event; Time of Event—indicating the time of business failure or event that might impact this volume; Severity of Event—indicating the criticalness of the business failure or event (this parameter has a direct correspondence to the additional length of time that CDP data for this volume is retained); Event Identifier—such as a token indicating a unique identifier for this event; and Completion Status—such as a return code indicating completion status of this API call.

Those skilled in the art would recognize that the example APIs described above may be configured to include additional or fewer parameters, depending on the configuration of the storage management system and the type of interfaces employed with the storage management system. Further, methods other than API calls may be used to establish or clear data retention events in connection with CDP data and rollups.

In another specific embodiment, a CDP Data Retention Policy is defined in connection with the use of a series of API calls such as those previously described. The policy may be used to indicate the following values relevant to CDP data retention:

Allow Dynamic CDP Data Retention, a value defined as either "ON" or "OFF", indicating whether CDP data retention may be extended.

Low Severity Retention, a value defined as an integer representing the amount of time to increase CDP data retention for low severity events.

Medium Severity Retention, a value defined as an integer representing the amount of time to increase CDP data retention for medium severity events.

High Severity Retention, a value defined as an integer representing the amount of time to increase CDP data retention for high severity events.

Figure 4:
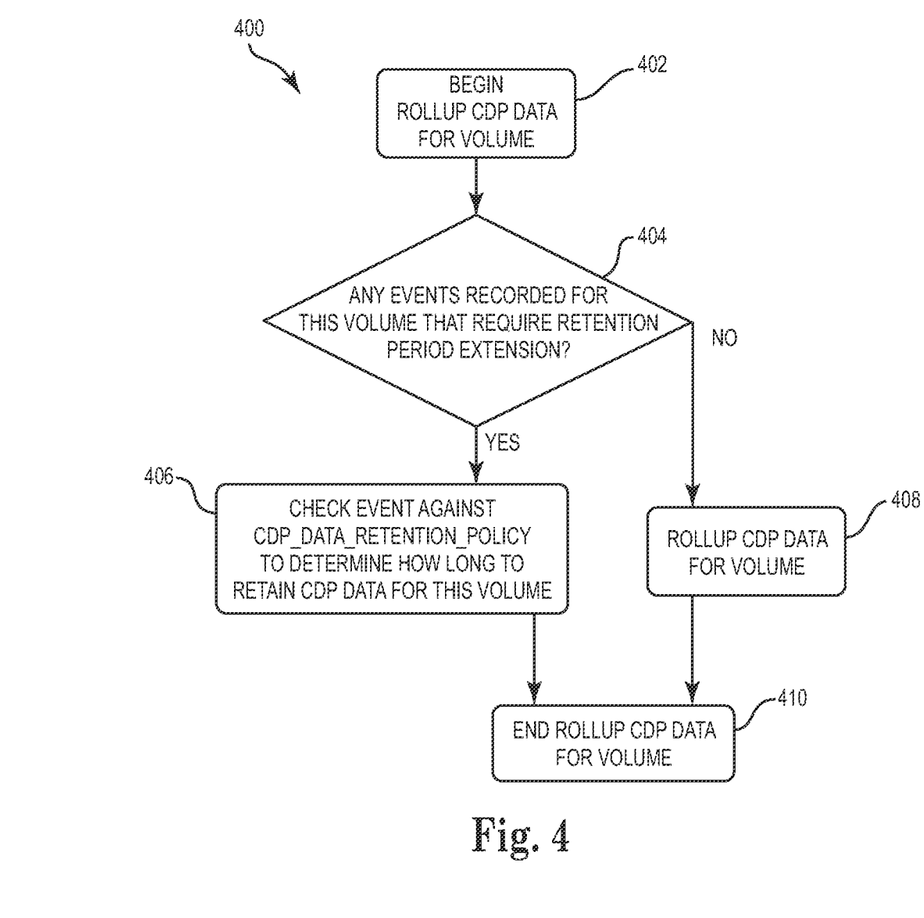
FIG. 4 provides an illustration of a flowchart for adjusting retention periods in conjunction with continuous data protection operations according to an embodiment of the present invention.

FIG. 4 provides an illustration of a logic flow 400 for improved CDP operations used to automatically adjust a retention period according to one embodiment of the present invention. As shown, the logic flow is initiated during a scheduled rollup of CDP data for a specific volume occurring as in step 402. A determination is made as in step 404 whether any events recorded for the volume require a retention period extension, in order to keep CDP data that might be useful or needed subsequent to the event. If no retention period extension is required, then the CDP data for the volume will be rolled up as in step 408.

If any events recorded for the volume require a retention period extension as determined in step 404, then the event is checked against a CDP Data Retention Policy as in step 406 to determine how long to extend the retention of CDP data for the volume. For example, if the severity is low, then the retention will equal the retention value plus a Low Severity Retention value. If the severity is medium, then the retention will equal the retention value plus a Medium Severity Retention value. If the severity is high, then the retention will equal the retention value plus a High Severity Retention value. After either the retention period is defined or the CDP data for the volume is rolled up, the rollup operation for the volume is complete as in step 410.

In a further embodiment, the monitoring and event management techniques described herein may be used to implement specific business event-based data protection. For example, the following events may be monitored, in conjunction with event management components that are utilized to initiate data protection operations for the associated data and storage. A simple policy may be introduced to control automated response for each business event type.

These business event types may include: upgrades to business applications (backups may be desirable both before and after upgrades); data movements or copies required by technology uplifts, application migrations, server migrations, and the like; system configuration changes; storage volume defragmentation processes; I/O errors on volumes; data or system failures; changes occurring based on an amount of changed data; and events which change large amounts of metadata such as changes to data security settings. Those skilled in the art would recognize other categories of information that would apply as a business event.

Therefore, the presently disclosed monitors may be configured to recognize specific business events, assess the impact of those events on data protection operations, analyze policy related to the specific events, and initiate event-driven backups as warranted. Further, data activity events may also occur in conjunction with a number of the business events Other variations to the presently disclosed embodiments are possible. A system may be configured to respond to data-related events or business-related events exclusively. Other policy values may be utilized in conjunction with or as a derivative value of the change rate objective. Likewise, other API calls, data components, and event monitoring components and strategies may be utilized in conjunction with the presently disclosed embodiments. Further, the features described herein may be embodied within stand alone or integrated storage management software, or components located throughout or even outside a storage system.

As will also be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for performing automated and self-adjusting backup operations, comprising:
    establishing, by use of a processor, a first change rate objective used for event-driven backups of a data store in a storage system, the first change rate objective measuring changes to a percentage of a total amount of data and a percentage of a total expected amount of data to be backed up in a time-scheduled backup for a specified client of a plurality of clients storing data within the data store resulting from one or more data activity events;
    establishing a first change rate objective value associated with the first change rate objective, the first change rate objective value defining a threshold value of client data change for performing backup operations of the data store;
    establishing a second change rate objective and an associated second change rate objective value, the second change rate objective used for postponing a scheduled full backup and conducting an incremental backup in lieu of the scheduled full backup, and the second change rate objective value defining a maximum amount of changed client data of the data store for an incremental backup;
    establishing a second change rate objective value associated with the second change rate objective, the second change rate objective value defining a threshold value of client data chance for postponing backup operations of the data store;
    monitoring the first change rate objective and the second change rate objective in the data store by comparing the first change rate objective value and the second change rate objective value with the changes to the data for the specified client within the data store resulting from the one or more data activity events;
    performing the backup operations in the storage system responsive to exceeding the first change rate objective value, thereby conducting automated and self-adjusting backup operations in the storage system based on the first change rate objective;
    postponing the backup operations in the storage system responsive to changes to the data for the specified client being less than the second change rate objective value;
    detecting a data retention event; and
    extending a data retention time for backed up data in response to the data retention event, wherein the extended data retention time is based on the first change rate objective value.

2. The method of claim 1, further comprising:
    establishing a time schedule used for time-driven backups of the data store at a series of scheduled times; and
    performing the backup operations in the storage system at each of the scheduled times;
    wherein the time-driven backups of the data store and the event-driven backups of the data store are each performed within the storage system based on time and the data activity events respectively.

3. The method of claim 2, wherein the time-driven backup operations of the data store are performed in coordination with event-driven backup operations performed in the storage system, including postponing, delaying, or altering the time-driven backup operations.

4. The method of claim 1, wherein the first change rate objective and the second change rate objective are established from multiple values related to data activity events in the data store.

5. The method of claim 1, wherein each change rate objective and the associated change rate objective value is further based on one or more additional data activity events including changes to metadata, an amount of data changed since a previous defined event, a percentage of data changed since a last backup, a specified amount of changed data, a measure of data activity in the storage system, and a number of transactions conducted within the storage system.

6. The method of claim 1, further comprising establishing a data activity backup policy specifying the sensitivity of backup operations to a plurality of data activity events in the storage system, wherein the data activity backup policy defines each change rate objective value and each change rate objective.

7. The method of claim 1, wherein a policy is used in connection with the event-driven backup operations, the policy including policy settings indicating whether to use client data change as a trigger to perform additional backups, whether to perform regularly scheduled time-based backups in conjunction with event-driven backups, and whether to continue with a regularly scheduled time-based backup after an event-driven backup is performed.

8. The method of claim 1, wherein the data store comprises one or more storage volumes within the storage system, and wherein the method is performed within the storage system as a result of execution of a computer program product on one or more computer hardware components.

9. A method for performing automated and self-adjusting data protection for continuous data protection operations of a data store in a storage system, comprising:
establishing, by use of a processor, a first change rate objective used for event-driven backups of a data store in a storage system, the first change rate objective measuring changes to a percentage of a total amount of data and a percentage of a total expected amount of data to be backed up in a time-scheduled backup for a specified client of a plurality of clients storing data within the data store resulting from one or more data activity events;
establishing a first change rate objective value associated with the first change rate objective, the first change rate objective value defining a threshold value of client data change for performing backup operations of the data store;
establishing a second change rate objective and an associated second change rate objective value, the second change rate objective used for postponing a scheduled full backup and conducting an incremental backup in lieu of the scheduled full backup, and the second change rate objective value defining a maximum amount of changed client data of the data store for an incremental backup;
establishing a second chance rate objective value associated with the second change rate objective, the second change rate objective value defining a threshold value of client data change for postponing backup operations of the data store;
monitoring the first change rate objective and the second change rate objective in the data store by comparing the first change rate objective value and the second change rate objective value with the changes to the data for the specified client within the data store resulting from the one or more data activity events;
performing the backup operations in the storage system responsive to exceeding the first change rate objective value, thereby conducting automated and self-adjusting backup operations in the storage system based on the first change rate objective;
postponing the backup operations in the storage system responsive to changes to the data for the specified client being less than the second change rate objective value;
initiating a data rollup for data provided by continuous data protection operations of the data store;
detecting a data retention event; and
extending a data retention time for backed up data in response to the data retention event, wherein the extended data retention time is based on the first change rate objective value.

10. The method of claim 9, the method further comprising providing a policy for extending retention of data produced from the continuous data protection operations, the policy specifying two or more events requiring a retention period extension and a duration of the retention period extension based on the two or more events, wherein the two or more events further comprise a business event selected from the group consisting of a business application upgrade, a data movement operation, a new software distribution, a system configuration change, a storage volume defragmentation process, one or more I/O errors, data loss, and a failure of at least one of a server, a volume, and an application.

11. The method of claim 10, further comprising evaluating the data store with a monitor for an occurrence of the two or more events requiring the retention period extension.

12. The method of claim 10, wherein the retention period of the data is reduced responsive to the two or more events being cleared.

13. The method of claim 10, further comprising providing a set of application programming interfaces within the storage system used for extending the retention period of the data with the retention period extension and clearing the two or more events causing the retention period extension, and receiving calls with the application programming interfaces to extend the retention period extension and clear the two or more events causing the retention period extension.

14. The method of claim 10, further comprising evaluating a severity of the two or more events, wherein the retention period of the data is adjusted according to the severity of the two or more events.

15. The method of claim 14, wherein a low, a medium, and a high severity and corresponding low, medium, and high retention period extensions are defined for each of the two or more events.

16. The method of claim 9, wherein the method is performed within the storage system as a result of execution of a computer program product on two or more computer hardware components.

* * * * *